United States Patent [19]

Nyman et al.

[11] Patent Number: 4,721,571
[45] Date of Patent: Jan. 26, 1988

[54] METHOD FOR DISPERSING TWO PHASES AND FOR SETTING THE DISPERSED PHASES

[75] Inventors: Bror G. Nyman; Stig-Erik Hultholm, both of Pori; Raimo J. Leimala, Harjavalta; Launo L. Lilja; Valto J. Mäkitalo, both of Pori, all of Finland

[73] Assignee: Outokumpu Oy, Helsinki, Finland

[21] Appl. No.: 564,770

[22] Filed: Dec. 23, 1983

Related U.S. Application Data

[63] Continuation-in-part of Ser. No. 194,060, Oct. 6, 1980, abandoned, which is a continuation of Ser. No. 50,684, Jun. 21, 1979, abandoned.

[30] Foreign Application Priority Data

Jun. 28, 1978 [FI] Finland ................................. 782069

[51] Int. Cl.⁴ ............................................. B01D 11/04
[52] U.S. Cl. ..................................... 210/634; 210/790; 210/802
[58] Field of Search ............... 210/634, 708, 790, 801, 210/802, DIG. 5; 23/306

[56] References Cited

U.S. PATENT DOCUMENTS

| | | | |
|---|---|---|---|
| 1,742,281 | 1/1930 | Rundlett | 210/801 X |
| 2,405,158 | 8/1946 | Mensing | 422/259 |
| 2,768,987 | 10/1956 | Hart | 422/225 |
| 3,690,621 | 9/1972 | Tanaka | 416/184 |
| 4,048,069 | 9/1977 | Cuvillier et al. | 210/84 |
| 4,117,560 | 10/1978 | Kidon et al. | 210/195.3 |
| 4,157,969 | 6/1979 | Thies | 210/521 |
| 4,235,602 | 11/1980 | Meyer et al. | 210/634 X |

FOREIGN PATENT DOCUMENTS 1087198 10/1967 United Kingdom ................. 422/258

OTHER PUBLICATIONS

Perry, Robert H. et al., *Chemical Engineer's Handbook*, Fifth Edition, McGraw-Hill Book Co., N.Y., 1973, pp. 21–4 to 21–6, 19–12.
Coplan, B. V. et al., "The Pump-Mix Mixer Settler . . .", Chem. Eng. Prog., vol. 50, No. 8, pp. 403–408, Aug. 1954.
Warwick, S. C. I. et al., "Considerations in the Design of Large Scale Solvent Extraction Plants . . .", Proc. Int. Solvent Extraction Conf., vol. II, pp. 1373–1385, 1971.
Mizrahi, J. et al., "The Development of Efficient Industrial Mixer-Settlers", Proc. Int. Solvent Extraction Conf., vol. 1, 1974, pp. 141–168.

*Primary Examiner*—David Sadowski
*Attorney, Agent, or Firm*—Brooks Haidt Haffner & Delahunty

[57] ABSTRACT

An extraction unit of the type having successively in the flow direction of the liquid, a mixer, a pre-settler and a settler, the pre-settler and the settler being separated from each other by several successive perforated partition walls, the perforations of each partition wall being laterally unaligned with the perforations of the following partition wall, the lower section of the mixer having inlets for the heavy phase and the light phase and a mechanical stirrer for mixing the heavy phase and the light phase to form a dispersion, and the upper section having at least one opening for directing the dispersion from the mixer to the pre-settler, the upper section of the settler having members for removing the separated light phase as an overflow from the settler, the lower section of which has an opening for the removal of the separated heavy phase from the settler as a controlled flow, and between the settler and the mixer there are pipes for returning part of the separated heavy and light phase from the settler to the lower section of the mixer. The mixer is at least in part surrounded by the pre-settler and the openings for directing the dispersion from the mixer into the pre-settler are on those sides of the mixer which are facing away from the perforated partition walls between the pre-settler and the settler, in order to lengthen the path of the dispersion coming from the mixer and to divide it into two partial flows following each side of the mixer and to cause these flows to impinge against each other before reaching the said perforated partition walls, in order to damp the flow and to promote the separation of the phases.

6 Claims, 4 Drawing Figures

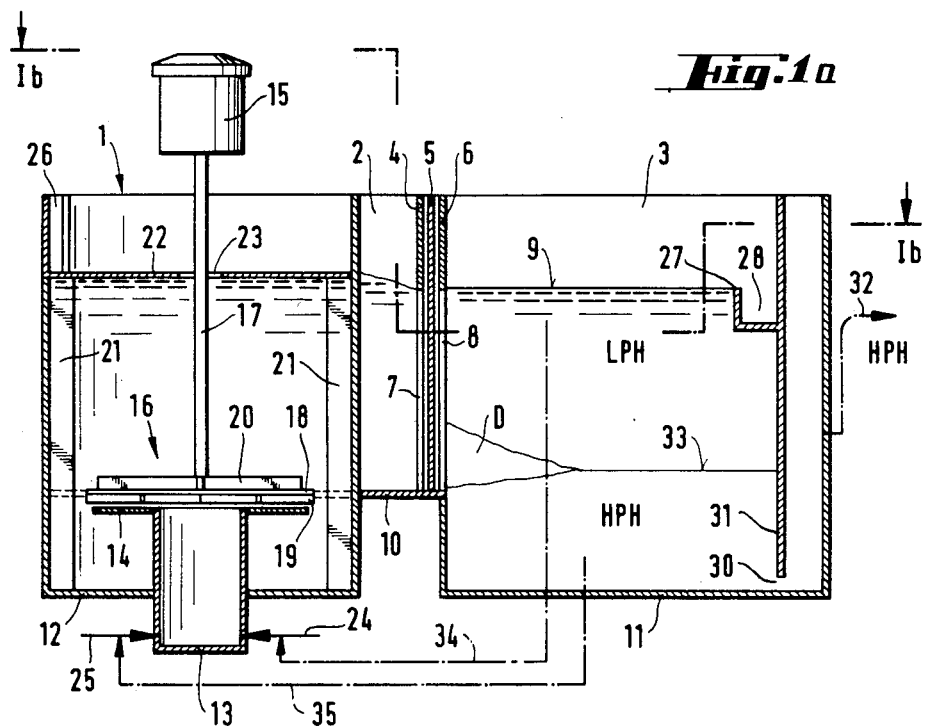
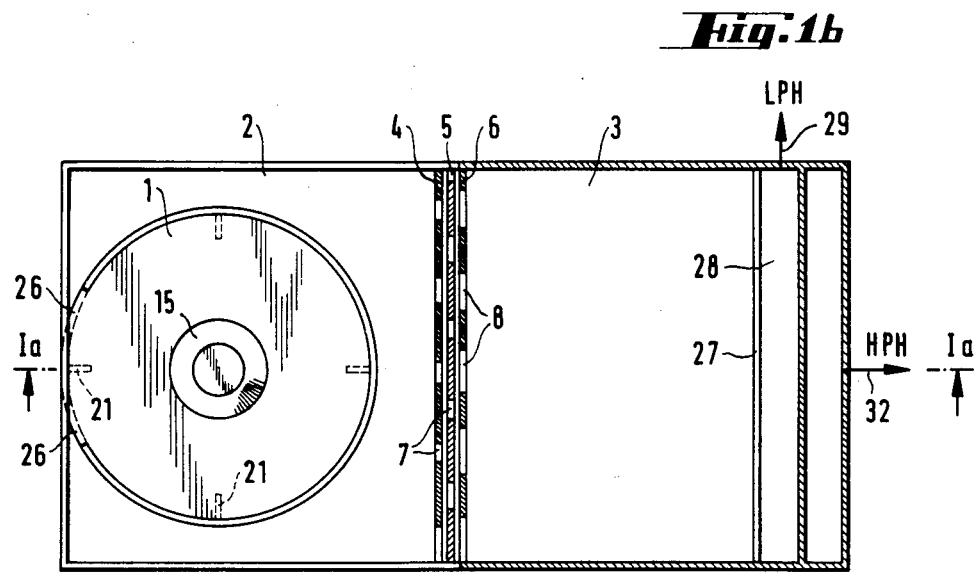

METHOD FOR DISPERSING TWO PHASES AND FOR SETTING THE DISPERSED PHASES

This is a continuation-in-part of application Ser. No. 194,060 filed Oct. 6, 1980, and now abandoned, which was a continuation of application Ser. No. 50,684 filed June 21, 1979 now abandoned.

BACKGROUND OF THE INVENTION

The present invention relates to an extraction unit which comprises, successively in the flow direction of the liquid, a mixer, a pre-settler, and a settler. By arranging several such extraction units in succession, an extraction apparatus is obtained.

In extraction units of the above type, transfer of material between two mutually immiscible or partly miscible liquids is achieved by bringing these liquids into contact with each other in a limited space, i.e. a mixer, by means of a rotating mechanical stirrer, whereafter the dispersion produced in the mixer is directed into another limited space, i.e. a settler, which constitutes part of the same extraction stage, in order to separate the two phases from each other by gravity.

Extraction units are known in which the mixer and the settler are separate vessels, in which case one phase is caused to flow from one extraction unit to another by means of gravity, the extraction units being at different levels, while the other phase is pumped countercurrently from one extraction unit to the next.

However, extraction units are known in which no pump is required between extraction units of an extraction apparatus operating according to the countercurrent principle (J. A. Wiliams, L. Lowes and M. S. Tanner, Trans. Inst. Chem. Engrs. Vol. 36, 464 (1958)). All units are at the same level. The turbine stirrer does not serve as a pump. By keeping the layer of dispersion in the settler at a level below the opening between the mixer and the settler, a pressure gradient is maintained in order to force the dispersion to flow into the settler, since the dispersion has a higher specific gravity than the light phase in the settler. Since the surface of the dispersion in the mixer settles at a level which is below the surface of the light phase in the settler of the adjacent unit, the light phase can flow from there to the mixer of the other unit, i.e., passage of phases between adjacent units is also possible.

In one prior known system, in which the mixer is provided with a pumping turbine stirrer which was originally developed for the treatment of nuclear fuel, the solution is drawn by suction upwards into a hollow turbine shaft and ejected between the blades of the turbine stirrer mounted on the shaft (B. V. Coplan, J. K. Davidson and E. L. Zebroski, Chem. Eng. Progr. Vol. 50 No. 8, p. 403 (1954)). In this case also, the dispersion is led directly from the mixer to the settler.

Recently various pump mixer-settler type extraction apparatus have been given their due recognition in the metallurgical industry. The following principles have been suggested for the system.

In one apparatus the mixer is level-floor vessel in which a turbine has been mounted (D.W. Agers and E.R. Dement, Proceedings International Symposium "Solvent Extraction in Metallurgical Processes", p. 27, Technologisch Institut K.VIV, Antwerpen 1972). The turbine located above the mutual inlet for the light and the heavy phase is structurally a horizontal plate provided with blades on the lower side. The turbine pumps the dispersion through the outlet in the upper section of the mixer and through an expanding trough directly into the settler. In the settler there are vertical perforated partition walls in the vicinity of the inlet of the dispersion in order to retard the flow of the dispersion.

Also known is a pump mixer-settler type extraction apparatus in which the cross section of the mixer is square and in which both the light phase and the heavy phase are directed into the mixer through a suction cylinder fitted at its floor (G. C. I. Warwick, J. B. Scuffham and J. B. Lott, Proceedings International Solvent Extraction Conference ISEC '71, Vol. 2, p. 1373, Society of Chemical Industry, London, 1971). The blades of the turbine are covered by an uniform round plate above and with a level, circular ring below, the opening of the ring being above the opening of the suction cylinder. The height of the suction cylinder has been dimensioned so that the turbine can be mounted in the center of the mixer. The dispersion is forced out through an opening, around the turbine shaft, in the horizontal partition floor, the partition floor delimiting upwardly the mixing chamber, whereafter the dispersion, undivided, flows over this partition directly downward into the settler and substantially on the same level as the dispersion layer in the settler, in which case the dispersion flow is directed by means of one vertical and one horizontal plate.

Also previously known is a pump mixer-settler type extraction apparatus in which two separate turbines have been mounted on the same shaft (T. K. Mattila, Proceedings Solvent Extraction Conference ISEC '74 Vol. 1, p. 169, Society of Chemical Industry, London 1974). The upper turbine improves the mixing effect of the lower pump turbine mounted in the vicinity of the mixer floor, above the inlet of the heavy phase, and gives a pressure impulse for directing the dispersion from the mixer into the settler. In this extraction apparatus the mixer turbine rotates at the level of the dispersion outlet pipe near the center point of the mixer as seen in the vertical direction. The dispersion is fed directly from the mixer into the settler, where the dispersion flow is retarded by stop plates which divide the dispersion. The extraction units have been advantageously graduated in the vertical direction so that light phase flows more easily by gravity into the following unit. The inlet for the light phase is in the upper section of the mixer.

In one extraction apparatus structure (J. Mizrahi, E. Barnea and D. Meyer, Proceedings International Solvent Extraction Conference ISEC '74, Vol. 1, p. 141, Society of Chemical Industry, London 1974), turbines mounted on separate, concentric shafts are used for stirring and pumping, in which case these actions can be regulated independently of each other. The pump turbine has been mounted in the rising cylinder which is above the stirring turbine. Both the mixer and the settler are cylindrical. The phases catering the mixer are directed towards the floor of the mixer, whereas the dispersion emerging from the mixer is fed directly to the center of the settler.

SUMMARY OF THE INVENTION

According to the present invention there is provided an extraction unit in which phase separation has been improved by adopting the space surrounding the mixer section as a pre-settler in order to direct the dispersion as two partial flows to be combined, and in which the mixer section, in order to improve the efficiency of the stage, has been divided into a smaller lower and a larger upper mixing chamber, using for this division a large pump turbine which stirs both mixing chambers; the stirring blades of the turbine have been shaped to give different stirring patterns within the said mixing chambers.

Thus the present invention relates to an extraction unit which comprises, successively in the flow direction of the liquid, a mixer, a pre-settler and a settler, in which case the pre-settler and the settler are separated from each other by several successive perforated partition walls, the perforations of each partition wall being laterally unaligned in relation to the perforations of the following partition wall, the lower section of the mixer has inlets for the heavy and the light phase and a mechanical stirrer for mixing the heavy and the light phase to form a dispersion, and the upper section has at least one opening for directing the dispersion from the mixer into the pre-settler, the upper section of the settler has members for removing the separated light phase as an overflow from the settler, the lower section of the settler having an outlet for removing the separated heavy phase from the settler as a controlled flow, and between the settler and the mixer there can be pipes for recycling part of the separated heavy and light phase from the settler to the lower section of the mixer.

In an extraction unit according to the invention the dispersion emerging from the mixer is divided into two partial flows which, when the phases separate in the pre-settler which entirely or in part surrounds the mixer, are directed along a lengthened path in the pre-settler against each other and into the settler through partition walls provided with openings or slits; the partition walls divide the partially separate dispersion into retarded partial flows at the inlet end of the settler, the partial flows extending from the surface or from near the surface of the light phase to a level which is preferably 0.15-0.40 times the height of the settler from its floor, the floor of the pre-settler being preferably also at this level.

The advantages the extraction unit according to the invention has over prior known extraction units include its space-saving structure and its more effective separation of the phases. In this case the space adjoining the mixer can be used completely without the dimensioning of the mixer and the settler being dependent on a certain geometrical form or without the mixer having to be constructed in a corner of the settler. Owing to improved phase separation a higher mixing efficiency can be used in the mixer, in which case the stage efficiency remains high even if the mixer section is reduced, or the stage efficiency is improved over that of a conventional mixer-settler unit, unless a considerably smaller mixer is the objective.

It is previously known that two or three partition walls fitted close to each other at the inlet end of the settler, having slits which are oblong in the vertical direction and unaligned in relation to the slits in the adjacent partition wall, improve phase separation in the settler by increasing the possibilities for the drops to impinge against each other and by damping turbulent flows in the settler. In this case mainly horizontal turbulence is reduced.

In the extraction unit according to the present invention, partition walls provided with oblong slits or other openings are also used between the settler and the pre-settler, in which case the last partition wall delimits the actual settler. In a case in which the floor of the pre-settler is at a higher level than the floor of the actual settler, the partly separated dispersion is not distributed over the lower section of the settler. In most cases this embodiment reduces the turbulence of each phase, caused by the separation of the phases themselves, in the vertical direction of the settler.

Each dispersion naturally favors a certain grouping ratio between the light and the heavy phase. An organically continuous petroleum/water solution tends towards a grouping in which the volume ratio of the light phase to the heavy phase is 0.35:1 (R. E. Treybal, Liquid Extraction, 2nd Edition, New York, 1963). In several extraction processes this ratio is considerably surpassed, especially if the ratio of light phase to heavy phase is increased intentionally in order to ensure the formation of an organically continuous dispersion. As a result, a rising flow of light phase rapidly separates from the dispersion in the settler, and this light phase, in addition, carries drops of the heavy phase along with it.

By directing the dispersion through slits in the upper section of the settler, in which case less material is required to move during the separation of the phases, disturbing turbulence in the vertical direction is reduced, especially since a considerable part of the phase separation has already taken place in the pre-settler. Thus the possibilites for achieving a nearly clear light phase in the settler are improved; this has often been difficult in case of dispersions in which the organic phase is the continuous one.

In order to distribute the dispersion into the settler it is important that the perforated partition walls of the pre-settler dam the dispersion in the pre-settler so that the surface of the dispersion is at a level 10-100 mm higher than that of the surface of the light phase in the settler. In a case in which the partition walls have been provided with slits oblong in the vertical direction, extending from the level of the light phase surface to the floor of the pre-settler and unaligned in the lateral direction in relation to the slits of the adjacent partition walls, a slit width must be used which is $\frac{1}{2}$-1/18 of the distance between the slits, when the partition walls are at a distance of 1-1.5 times the slit width from each other and when the number of the partition walls is 2 or 3 and the number of slits per partition wall is 8-20. Other combinations of the slit width, the distance between the slits, the distance between the partition walls and the number of partition walls and slits can also be used.

According to the present invention the mixer is entirely or partly surrounded by the pre-settler so that the distance between the mixer and the settler, and thereby the retention time of the dispersion in the pre-settler, is lengthened, and therefore the phases can be caused to separate partly even before they reach the settler. This reduces the number of small secondary drops forming during the phase separation in the settler; such drops can cause disturbing cloudiness. Phase separation is promoted by the fact that the dispersion is divided into two partial flows which are directed against each other in the pre-settler, in which case, in addition to increased promotion of phase separation by the wall effect and the wetting properties of the structural materials, greater possibilities are offered for phase separation in accordance with the drop-drop mechanism. In addition to a longer retention time, a thick dispersion layer can be obtained in the pre-settler and this promotes phase separation. The division of the dispersion into two partial flows which are directed against each other in the presettler retards the flow, thereby creating favorable conditions for the separation of the phases in the pre-settler.

The pre-settling zone lengthens the phase contact and when dispersion flows through the pre-settling zone in two dammed and horizontally or nearly horizontally directed partial flows, the flow motion of which retards the separation of the phases but not fully stop it. The velocity of the partial flows is increased after the division of the dispersion depending on the separation properties of the extraction system in question to 0.01–0.1 m/s and is decreased back and simultaneously the partial flows are combined before the opening zones which lead to the settling zone.

The pre-settling zone separates the light phase on the surface and the heavy phase on the bottom and enlarges the drop size of the dispersion. When the dispersion moves as a thick layer, the small drops impinge more often to their own phase, to which they thus more easily can join than in the case where dispersion directly could broaden to a thinner layer in the settling zone having less flow motion.

The pump turbine lifts the dispersion through an opening in the horizontal partition wall which damps turbulence in the mixer, the partition wall delimiting upwardly the mixing chamber of the mixer, whereafter the dispersion flows along the upper side of the partition wall into the pre-settler through one or two sector openings, in a direction which is away from the settler.

The pre-settling zone divides the pre-settled dispersion to the settling zone over its whole width as damped partial flows and in height direction to such a level which causes as small motion as possible in the settling zone as a result of the complete separation of the phases. For this reason, neither the pre-settling zone nor thus also the opening zones do in general extend as deep as the settling zone, and the pre-settling zone separates more light phase than heavy phase in most cases. For damping the partial flows moving to the settling zone the opening size of the opening zone increases in the flow direction the successive openings being staggered in relation to each other in side or height direction.

In a preferred embodiment of the invention, both the light phase and the heavy phase are directed into the mixer through a short suction cylinder mounted at its floor, the mouth of the cylinder being at a distance of 1/6–⅓ of the mixer height from the floor of the mixer. It is generally known that a certain required mixing effect can be produced in a dispersion at a lower peripheral velocity of the turbine if its diameter is increased. A lower peripheral velocity has an advantage in that the proportion of small drops, difficult to separate, is reduced. In this caes the diameter of the turbine is 0.5–0.8 times the width of the mixer. The turbine has a round plate, the plate having on its lower side blades which curve backward in relation to the rotational direction. The blades have been fitted to extend as far as the edge of the round plate, on the upper side of which there are preferably radially directed straight blades which extend to such a distance from the shaft of the turbine as is 0–33% shorter than the respective distance from the shaft of the blades on the lower side of the round plate. In a case in which there is an obvious risk of formation of emulsions which are difficult to separate, the upper blades of the turbine can be eliminated. The turbine has been mounted at the lower end of a vertical shaft, immediately above the mouth of the suction cylinder. The shape of the mixer is preferably cylindrical, and on its inner wall there are preferably 3–5 vertical guide plates which damp radial turbulence. These plates protrude from the inner wall of the cylinder over a distance which is 0.08–0.12 times the diameter of the mixer.

The mixing pattern improving the stage efficiency of the extraction unit according to the invention has been obtained by using a large turbine, the upper blades of which have been dimensioned to produce a higher pressure than the lower ones, and by dividing the mixer into a larger upper and a smaller lower mixing chamber. Because of the different shapes of the blades in the upper and the lower mixing chamber the mixing is more turbulent in the upper mixing chamber and more even in the lower chamber. Thus, greater possibilities have been created for a high stage efficiency, since by the structure according to the invention it is possible to achieve partly the same advantageous effect as with a more complicated structure according to which the mixer is divided by a horizontal partition wall into two chambers the contents of which are stirred by means of separate turbines, the chambers being connected with each other through an opening surrounding the mutual shaft.

The pumping effect of the turbine is improved by means of a circular ring the inner diameter of which is the same as that of the suction cylinder and the outer diameter of which is 0.5–1.0 times the diameter of the turbine. The circular ring is attached tightly in a horizontal position to the mouth of the suction cylinder or to the lower edges of the lower blades of the turbine. The pumping effect of the turbine depends on the height difference between the lower section of the turbine and the mouth of the suction cylinder. In order to reduce this dependence in a case in which the circular ring has been attached to the lower blades, the circular ring can be provided with a cylinder attached to its inner edge, the cylinder extending concentrically over some distance into the suction cylinder. The clearance between the concentric cylinders in this case determines the pumping effect of the turbine and the internal circulation produced between the lower mixing chamber and the suction cylinder at different rotational velocities of the turbine.

DESCRIPTION OF THE DRAWINGS

FIGS. 1a and 1b illustrate longitudinal vertical and horizontal sections of a preferred embodiment of the invention and FIGS. 2a and 2b illustrate an alternative embodiment of the invention in similar sections.

DESCRIPTION OF THE PREFERRED EMBODIMENTS

Figure 2A:
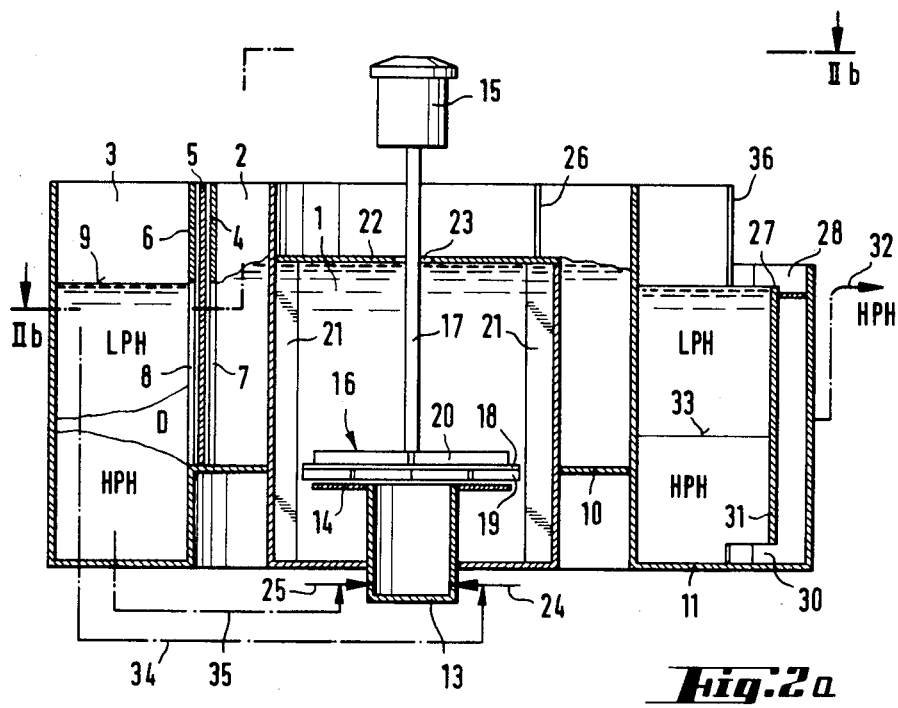

The extraction unit shown in FIGS. 1a and 1b has a cylindrical mixer 1 surrounded by a pre-settler 2 which has a square cross section and is delimited by a settler 3 having a rectangular cross section. The side of the mixer 1 is tangent to the farthest side of the pre-settler 2 as seen from the settler 3, along the vertical center line of this side. In this case the pre-settler 2 surrounds nearly entirely the mixer 1, and therefore the space around the mixer 1 can be used effectively. Between the pre-settler 2 and the settler 3 there are three transversal vertical partition walls 4, 5 and 6, which are spaced mutually at a distance which corresponds to the width of the oblong slits in these walls. The width of the slits, oblong in the vertical direction, is in partition walls 4 and 5 1/6 and in partition wall 6 ⅓ of the distance between the slits. In one partition wall the slits are unaligned in the lateral direction in relation to the slits in the following partition wall and extend from the surface 9 of the light phase in the settler 3 as far as the floor 10 of the pre-settler 2, in which case there are slits over the entire width of the settler 3. The last partition wall 6 of the pre-settler 2 at the same time constitutes one wall of the settler 3, which has a rectangular cross section. The floor 10 of the pre-settler 2 is at a higher level than the floor 11 of the settler 3. The height difference is 3/10 of the height of the settler 3.

A short suction cylinder 13 has been installed centrally through the floor 12 of the mixer 1; a uniform circular ring 14 has been fitted horizontally and tightly around the open upper end of the suction cylinder 13. This ring is at a distance of 1/5 of the mixer height from the floor 12 of the mixer 1, the diameter of the suction cylinder 13 being 1/5 of the diameter of the mixer. The turbine 16 is driven by a motor 15 and held in a centered position above the mouth of the suction cylinder 13 by a shaft 17. The turbine 16 consists of a round plate 18 having a diameter 0.65 times the diameter of the mixer 1 and 1.1 times the outer diameter of the circular ring 14. Below the round plate 18 there are six blades 19 directed backward in relation to the rotational direction, and their tips extend as far as the edge of the round plate 18, and on top of the round plate 18 there are four straight blades 20. The span of the upper blades 20 is 0.85 times the span of the lower blades 19. The inner wall of the mixer 1 has been provided with four radial flow-guide plates 21 which damp turbulence and have a width 0.1 times the diameter of the mixer 1, and with a horizontal partition wall 22 which delimits upwardly the mixing chamber of the mixer 1. The partition floor 22 has a round central opening 23 for the removal of the dispersion from the mixing chamber. The area of the outlet 23 is approx. 10% of the cross sectional area of the mixer 1.

Light phase and heavy phase are fed into the mixer 1 through the inlet pipes 24 and 25 of the suction cylinder 13. The pump turbine 16 lifts the dispersion through the opening 23 around the turbine shaft 17 onto the horizontal partition floor 22, whereafter the dispersion flows over it into the pre-settler 2 through two openings 26 which are on each side of the vertical tangent of the mixer 1 and the pre-settler 2. Having traveled over a lengthened distance on each side of the mixer 1 the two dispersion flows are directed, while there occurs separation of the phases, against each other and through perforated partition walls 4, 5 and 6 into the settler 3 for the final separation of the remaining dispersion. After a flow which resembles an even plug flow in the settler 3, the separated light phase LPH flows over the horizontal dam 27, which constitutes one side in a slightly inclined collector trough 28, and out through an outlet 29 into the suction cylinder (not shown) of the following extraction unit. The separated heavy phase HPH is directed in countercurrent coupling into the suction cylinder (not shown) of the previous stage, having flowed through a horizontal clearance 30 between the settler end 31 and a continuation of the floor 11 of the settler 3 and over the regulatable overflow 32 which regulates the height of the phase interface 33. It should be noted that the inlet and the outlets are on opposite sides of the settler 3 and extend over its entire width. The light phase LPH and the heavy phase HPH can if necessary, be recycled from the settler 3 to the mixer 1 of the same extraction unit via return pipes 34 and 35.

That side of the pre-settler which is tangent to the mixer in the previous example can also be cylindrical or have some other shape, if required. Likewise, the settler need not necessarily be rectangular but can be delimited by curved sides.

Figure 2B:
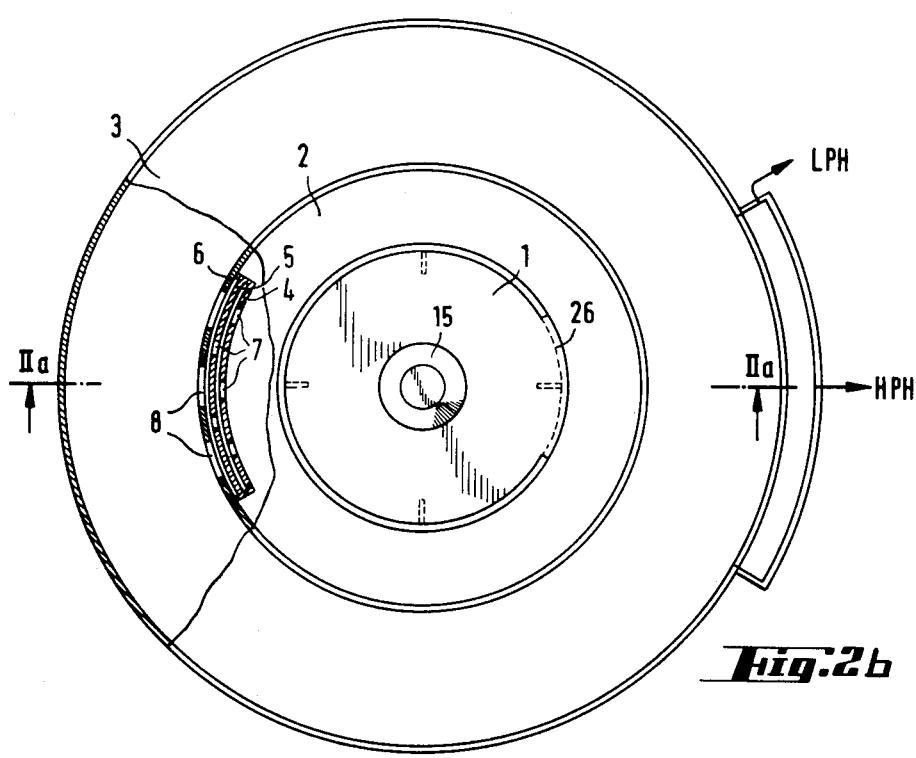

In the embodiment according to FIGS. 2a and 2b a cylindrical pre-settler 2 surrounds concentrically a cylindrical mixer 1 and is itself surrounded by a cylindrical settler 3.

In this case only one opening 26 is required for removing the dispersion from the mixer 1 into the pre-settler 2 and for dividing the dispersion into two partial flows. In this case also, the partial flows travel along a lengthened path on both sides of the mixer 1 and impinge against each other before they flow through the perforated partition walls 4, 5 and 6 into the settler 3. The flow is divided once more into two partial flows in the settler 3. The separated light phase LPH flows into the collector trough 28 through a horizontal clearance 36 in the wall of the settler 3. The clearance 36 at the same time forms an overflow dam 27 for the light phase emerging from the settler and the partition walls 4, 5 and 6 are on the opposite side of the pre-settler 2. The separated heavy phase HPH is removed in the same manner as above, after it has in this case flowed through a horizontal clearance 30 between the continuation of the floor 11 of the settler 3 and the outer wall 31 into a space outside the settler 3. In this space there is a regulatable outlet pipe 32 for regulating the level of the phase interface 33 between the light phase LPH and the heavy phase HPH in the settler 3. For recycling part of the light phase LPH and the heavy phase HPH from the settler 3 into the mixer 1 the extraction unit has return pipes 34 and 35 from the settler 3 which join the inlet pipes 25 and 24 of the mixer 1.

The width of the outlet 26 of the mixer 1 in the circumference direction of the mixer is preferably approximately 30° and the width of the partition walls 4, 5 and 6 in the circumference direction of the pre-settler is approximately 65°. The width of the outlets 36 and 30 in the circumference direction of the settler is preferably 45°. The floor 10 of the pre-settler is preferably 0.35 times the height of the settler 3 higher than the floor 11 of the settler 3. The slits 7 and 8, oblong in the vertical direction, of the partition walls 4, 5 and 6 extend from the floor 10 of the pre-settler 2 upwards to such a distance from the surface 9 of the light phase LPH in the settler 3 as is at maximum approx. 0.10 times the height of the settler 3. There are three partition walls 4, 5 and 6, and their distance from each other is 1½ times the width of the slits, whereas the width of the slits is 1/5 of the distance between two adjacent slits. In this cases, also, the slits 7 of the walls 4 and 5 are laterally unaligned in relation to each other in such a manner that a slit 7 leads directly towards an unperforated wall part of the following partition wall 5. The distance between the side walls of the pre-settler 2 and the settler 3 is 2½ times greater than the distance between the side walls of the pre-settler 2 and the mixer 1. The dimensions of the partition walls 4, 5 and 6 describe the orders of magnitude which, together with the level of the floor 10 of the presettler 2 and the widths of the pre-settler 2 and the settler 3, are determined in more detail according to the use of the extraction unit involved.

With the purpose of lengthening the flow distance between the mixer and the settler, several concentric pre-settlers can be installed one inside the other, in which case the structure of the mixer and the settler is the same as in FIGS. 2a and 2b. Instead of partition walls 4, 5 and 6 the first pre-settler has, within the same sector as the partition walls 4, 5 and 6, several openings which connect the first pre-settler to the next one. The respective connecting openings of the second pre-settler are dislocated 180° in relation to the connecting openings of the first pre-settler. There is always a corresponding dislocation between the two next pre-settlers. That pre-settler which is delimited by the settler has, instead of connecting openings, the said perforated partition walls.

What is claimed is:

1. A method for mixing two different phases of a liquid-liquid extraction with each other to form a dispersion and for settling of said dispersion at least in two steps, whereby both a heavy liquid phase and a light liquid phase are directed from below upwards to a mixing zone under a mixer, for causing flowing mixing motion in a lower section of the mixing zone and turbulent mixing motion; directing the resulting dispersion to a pre-settling zone surrounding at least partially the mixing zone through an opening or openings directed away from a settling zone, and thereby directing the dispersion to flow in two partial flows around the mixing zone to retard the velocity of flow of the dispersion without fully stopping the flow of the dispersion to cause partial separation of the phases in the pre-settling zone, and causing the partial flows to impinge against each other, producing a combined partially settled phase dispersion; causing said partially settled phase dispersion to flow to the settling zone through means defining several vertical rows of openings arranged higher than the bottom of the settling zone, said rows of openings being unaligned in relation to each other; and directing the settled phases separately away from the settling zone.

2. A method according to claim 1 wherein the mixer has a first diameter and the mixing zone has a second diameter said first diameter being 0.5–0.8 times said second diameter.

3. A method according to claim 1, wherein the mixer is in a lower section of the mixing zone.

4. A method according to claim 1, wherein said dispersion is made to flow to the settling zone through means which define rows of openings having successively greater widths.

5. A method according to claim 1 wherein the means defining rows of openings cause the dispersion to have an upper surface of the dispersion in the pre-settling zone which is about 10–100 mm higher than an upper surface of said light liquid phase in the settling zone.

6. A method according to claim 1, wherein the dispersion is made to flow through means defining at least three successive rows of openings.

* * * * *